Patented Mar. 19, 1940

2,193,815

UNITED STATES PATENT OFFICE 2,193,815

CATALYTIC DEHYDROGENATION AND THE LIKE

Llewellyn Heard, Hammond, Ind., assignor to Standard Oil Company, Chicago, Ill., a corporation of Indiana No Drawing. Application December 13, 1937, Serial No. 179,452

11 Claims. (Cl. 196—50)

This invention relates to catalytic reactions, more particularly to catalytic hydrocarbon decomposition reactions and especially to catalytic dehydrogenation. Still more particularly it relates to catalytic dehydrogenation carried on by the use of complex catalysts characterized by the presence of nickel borate.

It is an object of this invention to provide new and improved methods which can be used to decompose and especially to dehydrogenate hydrocarbons, particularly commercial naphthas and other stocks boiling within or somewhat above the gasoline range, which will operate efficiently and which will be characterized by long catalyst life. It is also an object of this invention to provide catalytic methods of the type mentioned in which the catalyst can be used for a long period before catalyst revivification is necessary. Another object of this invention is to provide new and improved methods of manufacturing gasoline of high antiknock value. Other and more specific objects of my invention will become apparent as the description thereof proceeds.

A great many catalysts have been tested by me for use in dehydrogenation reactions. In these tests a sweetened 8-carbon-atom cut from a commercial straight-run Mid-Continent naphtha, containing about 50% paraffins, 20% aromatics and 30% naphthenes, was fed at ordinary pressures through a heated catalyst tube. Unreacted hydrocarbons as well as hydrocarbon products were condensed by the successive use of an air condenser, a water condenser and a carbon dioxide-acetone condenser. The hydrogen and other uncondensed gases were then collected and measured in an effusiometer. The refractive index and other properties of the resulting products were studied in order to follow the course of the reaction.

Many borate catalysts, particularly tetraborate catalysts, were studied in the course of this work, and it was found that, in general, the metallic borates were not satisfactory dehydrogenation catalysts. These borates were prepared in most instances by dissolving a soluble metal salt such as the chloride, nitrate, sulfate or acetate of a heavy metal in water and then adding to this solution an aqueous solution of sodium tetraborate, commonly known as borax. The metallic borates thus precipitated were filtered, washed, dried, and tested as dehydrogenation catalysts as described in the preceding paragraph.

As previously indicated, these materials were for the most part ineffective as catalysts in the dehydrogenation reaction studied. Thus, for example, iron tetraborate containing some excess of ferric nitrate from the precipitation reaction, was found to be worthless. Similarly, pure ferric tetraborate obtained by thorough washing of the precipitate was found to be not sufficiently active for use in dehydrogenation. The same was true of cobalt tetraborate and also of mixed cobalt and ferrous tetraborates precipitated by sodium tetraborate from a solution of equimolal proportions of cobalt sulfate and ferrous sulfate. Pure uranium tetraborate was likewise ineffective, as was pure calcium tetraborate. The product precipitated by sodium tetraborate from a solution of cromium nitrate was also found to be ineffective.

The outstanding exception to the non-effective nature of the borates as dehydrogenation catalysts are the nickel borates, particularly nickel tetraborate. This catalyst is an extremely effective dehydrogenation catalyst, but it is altogether too active for satisfactory commercial use. It not only breaks C—H linkages with great facility, but likewise accomplishes the scission of C—C linkages and precipitates carbon which masks the catalyst and necessitates revivification after a short run.

I have found, however, that nickel tetraborate can be used as a promoter with relatively inactive substances to give an unusually excellent dehydrogenation catalyst.

The preferred example of this is a catalyst containing the mixed or double tetraborates of nickel and cobalt. The cobalt tetraborate should be present in considerable excess and I prefer to use from 10 to 25 mols of cobalt tetraborate to one mol of nickel tetraborate. A catalyst containing 7.5 mols of cobalt compound to one of nickel compound forms carbon with undesirable rapidity. The ratio of 15 mols cobalt tetraborate to one mol nickel tetraborate has given particularly good results. This catalyst can be prepared by mixing a solution consisting of 87 grams of $CoSO_4.7H_2O$ and 5 grams of $Ni(C_2H_3O_2)_2.4H_2O$ in 4,000 cc. of water with the stoichiometrical amount of $Na_2B_4O_7.10H_2O$ likewise dissolved in 4,000 cc. of water, stirring, settling, washing by decantation, filtering, and oven drying at 110–120° C. This yields a shiny, dark green granular catalyst which is ready for use.

This catalyst, like other catalysts prepared in accordance with my invention, can be used for the dehydrogenation of hydrocarbons, particularly commercial naphthas, at temperatures between about 600° F. and about 1050° F. However, catalyst temperatures within the range of from about 750° F. to about 1000° F. are preferred. Atmospheric pressure is suitable but higher and lower pressures can be used, for instance from about five pounds per square inch absolute to about 30 pounds per square inch or higher. A space velocity of 0.5 volume of feed (liquid) per volume of catalyst space per hour is suitable but this can be varied greatly. In general space velocities of from about 0.1 reciprocal hour to about 4 reciprocal hours can be used.

The catalyst prepared in accordance with my preferred embodiment, above described, has been used extensively and it has been found that runs totalling at least several days can be made before the catalyst needs to be revivified. This revivification is accomplished by controlled air blowing, for instance at temperatures of from about 350° F. to about 1000° F., to oxidize and remove the very slight amount of carbon formed. The revivification step can be controlled by controlling the temperature, by controlling the amount of air or other oxygen-containing gas used, or by dilution of air with inert gases such as nitrogen, carbon dioxide, flue gas, etc. Steam can also be used for revivification purposes, alone or with air.

As an example of a process using one of my new catalysts the 8-carbon-atom cut referred to above was subjected to 50 cc. of the catalyst containing 15 mols of cobalt tetraborate to one of nickel tetraborate in two runs at temperatures ranging from 850° F. to 980° F. The feed rate was 33 cc. per hour, measured as liquid, although the reaction occurs, of course, in the vapor phase. At a temperature of 970–980° F. the gas evolution was about 35 cc. per minute and the gas evolved was about 70% hydrogen. The increase in refractive index and in octane number for the liquid product (once through) of these two runs as compared with the stock was:

|  | Refractive index | Octane number |
|---|---|---|
| Stock | 1.4188 | 38 |
| Product (average) | 1.4253 | 56 |

There was no carbon deposited during these runs and the physical appearance of the catalyst was unchanged.

Many runs have been made using a straight-run naphtha with equally striking results. A temperature of approximately 955° F. has been found very suitable. The feed rate has a very considerable effect on the extent of the dehydrogenation reaction. Thus doubling the feed rate approximately halved the rate of hydrogen evolution.

Using a straight-run Mid-Continent sour naphtha of 46 octane number as the substrate and distilling the once-through product to substantially the same A. S. T. M. distillation characteristics as the stock, it was found that the octane number had been increased to 53.5 or an increase of 7.5 units. Sour naphthas are notably resistant to octane number increase by dehydrogenation and a 7.5 unit increase is very favorable.

While I have found that a catalyst consisting of cobalt tetraborate promoted with a small amount of nickel tetraborate is peculiarly satisfactory as above described, good catalysts promoted with nickel tetraborate can be made in which various other metals are substituted for the cobalt. Generally speaking, the most satisfactory metals are those falling within Groups II, III and VIII of the Mendeléeff periodic table. In any event the catalyst is prepared by precipitating an aqueous solution of a soluble salt of the metal selected and a soluble nickel salt such as nickel chloride, nitrate or acetate with an aqueous solution containing borate ions. Sodium tetraborate, and potassium tetraborate are the preferred sources of the borate ions.

A satisfactory catalyst can be made by co-precipitating calcium tetraborate and nickel tetraborate. Calcium tetraborate alone is inactive, while in equimolal mixture with nickel tetraborate (co-precipitated) it is even more active than pure nickel tetraborate, evolves much hydrogen, and deposits carbon heavily. However, if the ratio of calcium to nickel is increased, the carbon deposition is greatly reduced and a satisfactory catalyst results although the catalyst is not as good as that containing cobalt tetraborate. A catalyst containing 10 mols of calcium tetraborate per mol of nickel tetraborate gives good results, although still higher ratios of calcium tetraborate to nickel tetraborate are preferred, for instance ratios up to 25 to 1.

Similarly, iron tetraborate co-precipitated with nickel tetraborate gives an unusually good catalyst. Thus, for example, a catalyst prepared by precipitating a solution of 97.2 grams of $FeCl_3.6H_2O$ and 25 grams of $Ni(C_2H_3O_2)_2.4H_2O$ with a solution of $Na_2B_4O_7.10H_2O$ followed by washing and drying, gave a smooth dehydrogenation run of twelve hours although some carbon was precipitated. The molal ratio of iron to nickel in this instance was, roughly, 3½ to 1, and higher ratios appear to be preferable to reduce carbon formation. Ratios similar to those for the mixed nickel-cobalt and nickel-calcium tetraborates can be used.

Another example of these complex catalysts can be made by precipitating a solution of equimolal quantities of nickel and aluminum nitrates with borax. It is probable that the aluminum tetraborate formed hydrolyzes to a considerable extent and that the aluminum is for the most part present in the final catalyst in the form of the oxide. In any event, the co-precipitated material gives good results and deposits substantially no carbon, although the activity decreases somewhat more rapidly than in the case of the cobalt-nickel catalyst. A catalyst has also been prepared using a molal ratio of 3 aluminum to 2 nickel and has given very promising results.

It will be noted that the optimum molal ratio for the source of the two metals which are co-precipitated varies, depending on the metal chosen, but this optimum ratio can readily be determined by experiment in the light of the principles herein set forth.

The precipitation of the mixed compounds can be carried out in various ways. My usual procedure has been to make up solutions of (1) the metal salts and (2) the borax so as to contain stoichiometrical quantities in equal volumes of the two solutions and then mix equal volumes of the two solutions rapidly with little stirring. This results in the precipitation of a gel which after washing and drying gives, in general, a hard shiny granule. However, catalysts can likewise be prepared by adding the borax solution very slowly with stirring and this gives, particularly in the case of the mixed cobalt and nickel tetraborates, a precipitate which filters rapidly and which dries to yield a granule substance which is dull and apparently porous, and which has a much greater volume per unit weight than does the product precipitated by the sudden addition of the borax solution.

I prefer to use the tetraborates, but other borates, particularly the metaborates, can be used. Furthermore, when the tetraborates are subjected to the conditions of the dehydrogenation reaction, some decomposition, dehydration, and/or reduction reactions no doubt take place, so that the catalyst actually present in the reaction chamber may be somewhat different chemically from that originally prepared. However, I refer to my catalysts as borates and tetraborates, since this is their original condition, and I mean thereby to cover the products formed from these materials under the conditions of the reactions in which they are used.

In general my catalysts have the composition $aM_wO_x.bNi_yO_z.cB_2O_3$ where M represents a metal (other than nickel) preferably from Groups II, III and VIII of the periodic system, $a$ is a number from 1 to about 25, $b$ is a number from 1 to 3, $c$ is a number from 2 to about 25, $w$ and $x$ are small integers and $y$ and $z$ are small integers, preferably 1. Water of crystallization may be present initially.

Two or three metals instead of one can be used with the nickel, for instance co-precipitated cobalt, iron and nickel tetraborates can be used.

While these catalysts are particularly suited to use in dehydrogenation of hydrocarbons they can be used in the dehydrogenation of other organic compounds. They can also be used in other reactions, particularly in catalytic cracking. In fact, some cracking inevitably occurs during the dehydrogenation of hydrocarbons such as naphthas. The gas produced in dehydrogenation using my catalysts often contains only 60% to 75% hydrogen and some light hydrocarbons such as methane and ethane are produced. If a stock boiling predominantly above the gasoline range is used and the temperature is high, for instance from about 850° F. to about 1100° F., these catalysts can be used as cracking catalysts. I can therefore speak of my catalysts broadly as hydrocarbon decomposition catalysts and the substrate in my process can be a naphtha, a naphtha cut, or a somewhat heavier stock. This stock is preferably produced by straight run distillation of petroleum but cracked stocks, stocks resulting from destructive hydrogenation, naphtha and heavier cuts from the catalytic reduction of carbon monoxide with hydrogen and other substrates can be used.

The processes which I have devised utilizing these new catalysts are particularly adapted to the manufacture of gasoline and I therefore prefer to use as a substrate for the process a hydrocarbon stock boiling predominantly within or above the gasoline boiling point range, for instance boiling predominantly within the range from about 100° F. to about 750° F. and preferably predominantly within the range from about 150° F. to about 450° F. However, processes using my catalysts can advantageously be applied to the dehydrogenation of lighter hydrocarbons such as ethane, propane, butane, isobutane, etc., to produce olefines for use in polymerization processes.

Thus while my invention has been described with particular reference to certain preferred embodiments it will be understood that these are by way of illustration and my invention should not be restricted thereto but only to the scope of the appended claims which should be construed as broadly as the prior art will permit.

This application is a continuation-in-part of my copending application Serial No. 176,631, filed November 26, 1937, in which the catalysts themselves and their method of manufacture are claimed.

I claim:

1. A process for decomposing a hydrocarbon feed stock into other hydrocarbons which comprises contacting said stock with a catalyst comprising nickel borate and a borate of a metal of the class consisting of calcium, cobalt and iron at a sufficiently elevated temperature to effect said decomposition, the mol ratio of nickel borate to the other metal borate being about 1:7.5 to 1:25.

2. The process of claim 1 wherein the stock is contacted wth the catalyst at a temperature of about 600 to about 1100° F., a pressure from about atmospheric to about 30 pounds per square inch and at a space velocity of about 0.1 to about 4.0 volumes of stock (liquid basis) per volume of catalyst space per hour.

3. The process of claim 1 wherein the decomposition is chiefly dehydrogenation.

4. The process of claim 1 wherein said feed stock is a petroleum naphtha boiling chiefly within the range from 150° to 450° F.

5. A process for decomposing a hydrocarbon feed stock into other hydrocarbons which comprises contacting said stock with a catalyst comprising nickel borate and cobalt borate at a sufficiently elevated temperature to effect said decomposition, the mol ratio of nickel borate to cobalt borate about 1:15.

6. The process of claim 5 where the stock is contacted with the catalyst at a temperature of about 600 to about 1100° F., a pressure from about atmospheric to about 30 pounds per square inch and with a space velocity of about 0.1 to about 4.0 volumes of stock (liquid basis) per volume of catalyst space per hour.

7. A dehydrogenation process comprising contacting a hydrocarbon mixture boiling predominantly within the range from about 150° F. to about 450° F. with a catalyst containing co-precipitated cobalt tetraborate and nickel tetraborate, the molal ratio of the two borates being approximately 15 to 1, at a temperature of from about 750° F. to about 1000° F., at a pressure of from about five pounds per square inch absolute to about 30 pounds per square inch and at a space velocity of from about 0.1 reciprocal hour to about 4 reciprocal hours.

8. A process for decomposing a hydrocarbon feed stock into other hydrocarbons which comprises contacting said stock with a catalyst comprising mixed nickel and calcium borates at a sufficiently elevated temperature to effect said decomposition.

9. The process of claim 8 wherein the stock is contacted with the catalyst at a temperature of about 600 to about 1100° F., a pressure from about atmospheric to about 30 pounds per square inch and at a space velocity of about 0.1 to about 4.0 volumes of stock (liquid basis) per volume of catalyst space per hour.

10. A process for decomposing a hydrocarbon feed stock into other hydrocarbons which comprises contacting said stock with a catalyst comprising nickel borate and iron borate at a sufficiently elevated temperature to effect said decomposition, the mol ratio of nickel borate to iron borate being about 1:3.5 to 1:25.

11. The process of claim 10 wherein the stock is contacted with the catalyst at a temperature of about 600 to about 1100° F., a pressure from about atmospheric to about 30 pounds per square inch and at a space velocity of about 0.1 to about 4.0 volumes of stock (liquid basis) per volume of catalyst space per hour.

LLEWELLYN HEARD.